(No Model.)

O. F. GARVEY.
WASHER.

No. 299,977. Patented June 10, 1884.

WITNESSES
James J. Nolan
Charles H. Titus

INVENTOR
Owen F. Garvey
By Walter B. Vincent Atty.

UNITED STATES PATENT OFFICE.

OWEN F. GARVEY, OF PAWTUCKET, RHODE ISLAND.

WASHER.

SPECIFICATION forming part of Letters Patent No. 299,977, dated June 10, 1884.

Application filed December 13, 1883. (No model.)

*To all whom it may concern:*

Be it known that I, OWEN F. GARVEY, of Pawtucket, in the State of Rhode Island, have made certain new and useful Improvements in Washers; and I do hereby declare that the following specification, taken in connection with the drawings, making a part of the same, is a full, clear, and exact description thereof.

Figure 4:
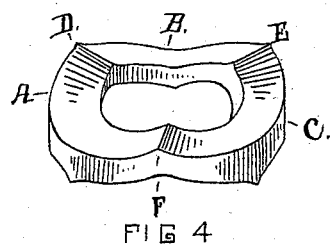
Figure 3:
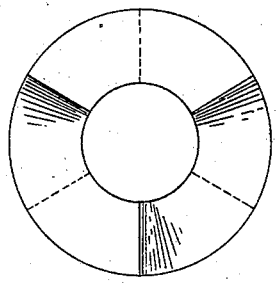
Figure 2:
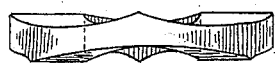
Figure 1:

Figure 1 is a section of my improved washer. Fig. 2 is a side or edge view. Fig. 3 is a top view. Fig. 4 is a perspective view.

The object of my invention is to produce a washer which will not rotate upon the bolt when subjected to jar, and at the same time will contain sufficient spring to protect the bolt and thread from damage in case of sudden strain; and it consists in constructing the same in the manner and for the purposes hereinafter described.

In my invention I construct the washer with its bearing-surface upon each side divided into three sections or segments, A B C, each of which is concaved or arched, as shown in Figs. 1, 2, 3, and 4. The different sections or segments A, B, and C unite in raised or projecting edges D E F, such edges upon one side being situated equidistant between those of the other.

The operation of my invention is as follows: The bolt and washer being adjusted, the nut is screwed down until it comes in contact with the latter. As the nut is forced farther on, the edges D E F embed themselves in the surface metal, and the washer itself becomes slightly flattened. The points or edges D E F may be sharpened or hardened, if found necessary, in order to insure the embedding of the same, as described; or slight indentations can be made with a suitable tool for their reception. The nut is not set up with sufficient force to entirely flatten the washer, the arches bracing against each other, and the washer being thick enough to prevent such flattening, or offer sufficient resistance to hold the parts secure before it occurs. The irregularity of such washer leaves spaces between it and the bearing-surface, and causes it to rest only upon the points or edges. It will now be readily seen that in the event of a sudden strain it will come more upon the washer, which is in the nature of a spring between the nut and the bearing-surface, and that the bolt and its thread will be correspondingly relieved, the embedded points or edges serving at the same time to prevent the washer and nut from turning, through the jar or shaking of the parts.

I divide my washer into three sections with three edges or points upon each side, because I consider such construction the most effective, although the same may be divided any number of times not less than three, as may be desired. The washers described may be struck from steel, or cast from malleable iron, and subsequently hardened, or made from other kinds of metal, such selection being to a great extent regulated by the service required of them. The washer is a continuous solid band, and the sharp points which form the junctions of the several concave sections serve to firmly hold the nut when it is screwed in place.

What I claim as my invention, and desire to secure by Letters Patent, is—

A washer formed with three or more concaved sections on its bearing-surfaces, the said sections being united by sharp points, as D E F, substantially as set forth.

OWEN F. GARVEY.

Witnesses:
WALTER B. VINCENT,
JAMES J. NOLAN, Jr.